US009432171B2

(12) United States Patent
Yan et al.

(10) Patent No.: US 9,432,171 B2
(45) Date of Patent: Aug. 30, 2016

(54) METHOD AND BOARD FOR HIGH-SPEED LINK AUTO-NEGOTIATION

(71) Applicant: HUAWEI TECHNOLOGIES CO., LTD., Shenzhen (CN)

(72) Inventors: Li Yan, Shenzhen (CN); Yunmin Tong, Shenzhen (CN); Ligang Huang, Shenzhen (CN); Xiaoqin Chen, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 141 days.

(21) Appl. No.: 14/089,117

(22) Filed: Nov. 25, 2013

(65) Prior Publication Data
US 2014/0078933 A1    Mar. 20, 2014

Related U.S. Application Data

(63) Continuation of application No. PCT/CN2011/074645, filed on May 25, 2011.

(51) Int. Cl.
H04L 12/24    (2006.01)
H04L 5/14    (2006.01)
H04L 12/413    (2006.01)
H04L 12/935    (2013.01)
H04L 12/40    (2006.01)
H04L 12/66    (2006.01)

(52) U.S. Cl.
CPC ........ H04L 5/1446 (2013.01); H04L 12/40013 (2013.01); H04L 12/413 (2013.01); H04L 41/145 (2013.01); H04L 49/3054 (2013.01)

(58) Field of Classification Search
None
See application file for complete search history.

(56) References Cited

U.S. PATENT DOCUMENTS

| 6,546,046 | B1 * | 4/2003 | Sweitzer et al. ............... 375/225 |
| 7,558,874 | B1 * | 7/2009 | Kodukula et al. ............. 709/237 |
| 7,836,199 | B2 * | 11/2010 | Brown .................... H04L 29/04 370/419 |
| 2007/0133562 | A1 | 6/2007 | Ghiasi | |
| 2007/0192595 | A1 | 8/2007 | Dacosta | |

FOREIGN PATENT DOCUMENTS

| CN | 101197831 A | 6/2008 |
| CN | 101616189 A | 12/2009 |

OTHER PUBLICATIONS

IEEE Standards, "Part 3: Carrier sense multiple access with collision detection (CSMA/CD) access method and physical layer specifications" IEEE Std 802.3-2002, 51 pages.

* cited by examiner

*Primary Examiner* — Eunsook Choi
(74) *Attorney, Agent, or Firm* — Brinks Gilson & Lione

(57) ABSTRACT a method and a board for high-speed link auto-negotiation, includes: setting, by a first board, a port rate to a public rate supported by both the first board and a second board; sending, by the first board, a first auto-negotiation packet to the second board according to the public rate, where the first auto-negotiation packet carries a rate supported by the first board, so that the second board determines, a highest rate supported by both the two boards, and sets the port rate to the highest rate; receiving, by the first board, a second auto-negotiation packet that is sent by the second board according to the public rate, which carries the rate supported by the second board; determining, by the first board, according to the rate supported by the two boards, the highest rate supported by both the two boards, and setting the port rate to the highest rate.

10 Claims, 3 Drawing Sheets

US 9,432,171 B2

METHOD AND BOARD FOR HIGH-SPEED LINK AUTO-NEGOTIATION

CROSS-REFERENCE TO RELATED APPLICATIONS

This application is a continuation of International Application No. PCT/CN2011/074645, filed 25 May 2011. The disclosure of the above application is incorporated herein by reference.

TECHNICAL FIELD

The present invention relates to the field of high-speed Ethernet, and in particular, to a method and a board for high-speed link auto-negotiation.

BACKGROUND

With rapid development of an Ethernet technology, high-speed Ethernet has been widely used, and a port rate of Ethernet is continuously increasing. However, formulation of an Ethernet industry standard often lags behind the development of the technology, so that when some Ethernet with high rates is have been widely used, auto-negotiation standards of the high rates have not been formulated, so that two ends of communication are difficult to be interconnected.

In a case that the auto-negotiation standards of the high rates have not been formulated, a out-band channel configuration manner or a fixed configuration manner is generally adopted to configure a rate in the prior art.

The out-band channel configuration manner means that when communication of a service channel is still abnormal, the service channel is configured through a maintenance channel. The maintenance channel requires hardware support.

The fixed configuration manner means that during initialization, rates at two ends of communication are fixedly configured to a certain high rate supported by the both two ends of the communication. When a rate capability of a certain end changes, manual reconfiguration is required, otherwise the two ends of the communication cannot be interconnected.

During implementation of the present invention, the inventor finds that the prior art has at least the following problems:

Rate configuration relies on specific hardware, or manual configuration is required to complete rate auto-negotiation, and rates cannot be switched flexibly.

SUMMARY

To cast off reliance on specific hardware, make manual configuration unnecessary, and to enable rates to be flexibly switched, embodiments of the present invention provide a method and a board for high-speed link auto-negotiation. Technical solutions are as follows:

A method for high-speed link auto-negotiation includes:

setting, by a first board, a port rate to a public rate supported by both the first board and a second board, where a port rate of the second board is the public rate;

sending, by the first board, a first auto-negotiation packet to the second board according to the public rate, where the first auto-negotiation packet carries a rate supported by the first board, so that the second board determines, according to the rate supported by the first board and a rate supported by the second board, a highest rate supported by both the first board and the second board, and sets the port rate to the highest rate;

receiving, by the first board, a second auto-negotiation packet that is sent by the second board according to the public rate, where the second auto-negotiation packet carries the rate supported by the second board; and determining, by the first board, according to the rate supported by the first board and the rate supported by the second board, the highest rate supported by both the first board and the second board, and setting the port rate to the highest rate.

A board for high-speed link auto-negotiation includes:

an initializing module, configured to set a port rate to a public rate supported by both the board and a second board, where a port rate of the second board is the public rate;

a sending module, configured to send a first auto-negotiation packet to the second board according to the public rate, where the first auto-negotiation packet carries a rate supported by the board, so that the second board determines, according to the rate supported by the board and a rate supported by the second board, a highest rate supported by both the board and the second board, and sets the port rate to the highest rate;

a receiving module, configured to receive a second auto-negotiation packet that is sent by the second board according to the public rate, where the second auto-negotiation packet carries the rate supported by the second board; and a managing module, configured to determine, according to the rate supported by the board and the rate supported by the second board, the highest rate supported by both the board and the second board, and set the port rate to the highest rate.

Beneficial effects brought by the technical solutions provided in the embodiments of the present invention are:

A rate supported by an end is notified to a peer end through an auto-negotiation packet, so that two ends of communication may learn a rate supported by each other, and determine, according to the rate supported by each other, a highest rate supported by both two ends of the communication. An auto-negotiation mechanism may be implemented through a packet without support of specific hardware, and at the same time, through the packet, a rate currently supported by an end may be notified to a peer end, so that dynamic switch of rates can be implemented, and compatibility and extensibility are good.

BRIEF DESCRIPTION OF DRAWINGS

To describe the technical solutions in the embodiments of the present invention more clearly, the following briefly introduces the accompanying drawings required for describing the embodiments. Apparently, the accompanying drawings in the following description show merely some embodiments of the present invention, and a person of ordinary skill in the art may still derive other drawings from these accompanying drawings without creative efforts.

DESCRIPTION OF EMBODIMENTS

To make the objectives, technical solutions, and advantages of the present invention more comprehensible, the following describes the embodiments of the present invention in further detail with reference to the accompanying drawings.

Figure 1:
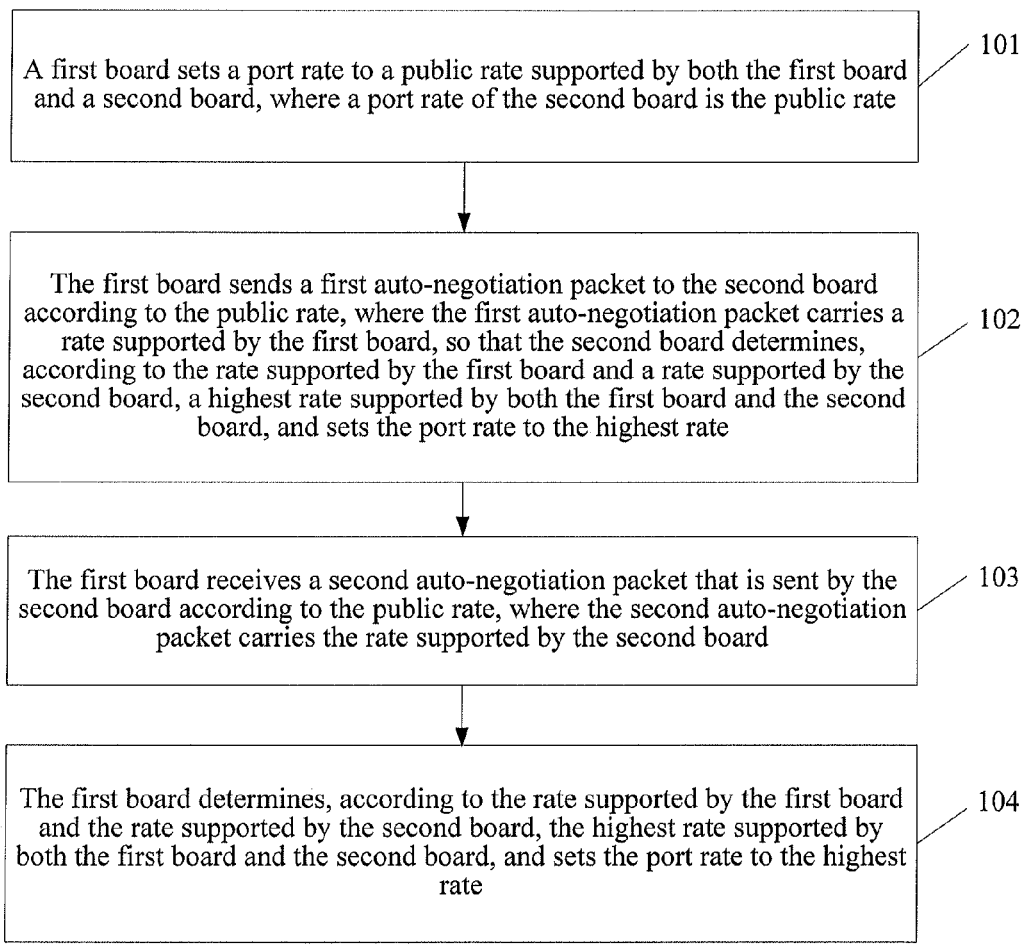
FIG. 1 is a flowchart of a method for high-speed link auto-negotiation according to an embodiment of the present invention.

Referring to FIG. 1, an embodiment of the present invention provides a method for high-speed link auto-negotiation, including:

101: A first board sets a port rate to a public rate supported by both the first board and a second board, where a port rate of the second board is the public rate.

102: The first board sends a first auto-negotiation packet to the second board according to the public rate, where the first auto-negotiation packet carries a rate supported by the first board, so that the second board determines, according to the rate supported by the first board and a rate supported by the second board, a highest rate supported by both the first board and the second board, and sets the port rate to the highest rate.

103: The first board receives a second auto-negotiation packet that is sent by the second board according to the public rate, where the second auto-negotiation packet carries the rate supported by the second board.

104: The first board determines, according to the rate supported by the first board and the rate supported by the second board, the highest rate supported by both the first board and the second board, and sets the port rate to the highest rate.

In this embodiment, a rate supported by an end is notified to a peer end through an auto-negotiation packet, so that two ends of communication may learn a rate supported by each other, and determine, according to the rate supported by each other, a highest rate supported by both two ends of the communication. An auto-negotiation mechanism may be implemented through a packet without support of specific hardware, and at the same time, through the packet, a rate currently supported by an end may be notified to a peer end, so that dynamic switch of rates can be implemented, and compatibility and extensibility are good.

Figure 2:
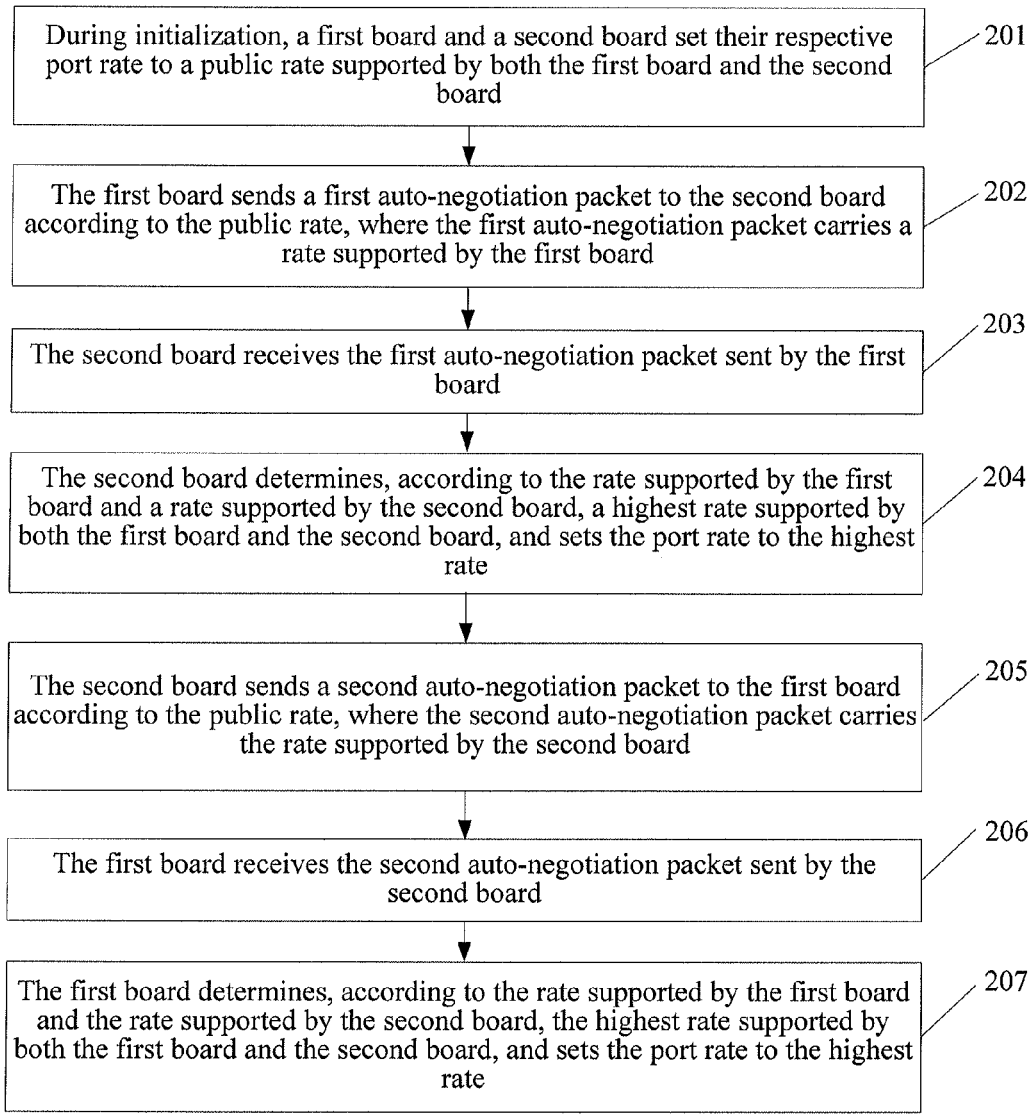
FIG. 2 is a flowchart of a method for high-speed link auto-negotiation according to another embodiment of the present invention.

Referring to FIG. 2, another embodiment of the present invention provides a method for high-speed link auto-negotiation, including:

201: During initialization, a first board and a second board set their respective port rate to a public rate supported by both the first board and the second board.

The public rate is generally a low rate, for example, 10 M (Megabit) or 100 M. A specific numerical value of the public rate is not limited in this embodiment.

This step may ensure that the first board and the second board are successfully interconnected.

202: The first board sends a first auto-negotiation packet to the second board according to the public rate, where the first auto-negotiation packet carries a rate supported by the first board.

Specifically, the first board may run an auto-negotiation task, where the auto-negotiation task sends the first auto-negotiation packet.

Further, the first board sends the first auto-negotiation packet continuously according to a specified time interval, so as to indicate that communication of the first board is normal and to notify a rate currently supported by the first board to the second board.

203: The second board receives the first auto-negotiation packet sent by the first board.

204: The second board determines, according to the rate supported by the first board and a rate supported by the second board, a highest rate supported by both the first board and the second board, and sets the port rate to the highest rate.

For a high-speed Ethernet link, a highest rate is generally greater or much greater than a public rate. For example, the highest rate may be 10 G (Gigabit, gigabit) or 100 G, and so on. A specific numerical value of the highest rate is not limited in this embodiment.

205: The second board sends a second auto-negotiation packet to the first board according to the public rate, where the second auto-negotiation packet carries the rate supported by the second board.

Specifically, the second board may run an auto-negotiation task, where the auto-negotiation task sends the second auto-negotiation packet.

Further, the second board sends the second auto-negotiation packet continuously according to a specified time interval, so as to indicate that communication of the second board is normal and to notify a rate currently supported by the second board to the first board.

206: The first board receives the second auto-negotiation packet sent by the second board.

207: The first board determines, according to the rate supported by the first board and the rate supported by the second board, the highest rate supported by both the first board and the second board, and sets the port rate to the highest rate.

Hereto, the first board and the second board complete a high-speed link auto-negotiation process, and may perform communication by using the highest rate determined through negotiation.

Subsequently, if the first board fails to receive, within a first preset time period, the second auto-negotiation packet sent by the second board, the first board sets the port rate to the public rate, that is, the first board regresses to use a low public rate. Then, the first board determines whether a first preset protection period is reached, and if the first preset protection period is reached, the first board re-executes step 207 and re-performs the high-speed link auto-negotiation process.

Being similar to a processing process of the first board, if the second board fails to receive, within a second preset time period, the first auto-negotiation packet sent by the first board, the second board sets the port rate to the public rate, that is, the second board regresses to use a low public rate. Then, the second board determines whether a second preset protection period is reached, and if the second preset protection period is reached, the second board re-executes step 204 and re-performs the high-speed link auto-negotiation process.

In this embodiment, a rate supported by an end is notified to a peer end through an auto-negotiation packet, so that two ends of communication may learn a rate supported by each other, and determine, according to the rate supported by each other, a highest rate supported by both two ends of the communication. An auto-negotiation mechanism may be implemented through a packet without support of specific hardware, and at the same time, through the packet, a rate currently supported by an end may be notified to a peer end, so that dynamic switch of rates can be implemented, and compatibility and extensibility are good.

Figure 3:
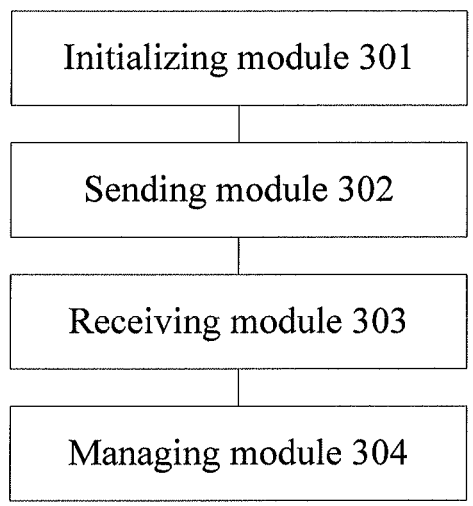
FIG. 3 is a schematic structural diagram of a board for high-speed link auto-negotiation according to another embodiment of the present invention.

Referring to FIG. 3, an embodiment of the present invention provides a board for high-speed link auto-negotiation, including:

an initializing module 301, configured to set a port rate to a public rate supported by both the board and a second board, where a port rate of the second board is the public rate;

a sending module 302, configured to send a first auto-negotiation packet to the second board according to the public rate, where the first auto-negotiation packet carries a rate supported by the board, so that the second board determines, according to the rate supported by the board and a rate supported by the second board, a highest rate supported by both the board and the second board, and sets the port rate to the highest rate;

a receiving module 303, configured to receive a second auto-negotiation packet that is sent by the second board according to the public rate, where the second auto-negotiation packet carries the rate supported by the second board; and a managing module 304, configured to determine, according to the rate supported by the board and the rate supported by the second board, the highest rate supported by both the board and the second board, and set the port rate to the highest rate.

Further, the managing module 304 is further configured to, after determining, according to the rate supported by the board and the rate supported by the second board, the highest rate supported by both the board and the second board, and setting the port rate to the highest rate, set the port rate to the public rate if the second auto-negotiation packet sent by the second board fails to be received within a first preset time period.

Further, the managing module 304 is further configured to, after setting the port rate to the public rate if the second auto-negotiation packet sent by the second board fails to be received within the first preset time period, determine whether a first preset protection period is reached; and if the first preset protection period is reached, determine, according to the rate supported by the board and the rate supported by the second board, the highest rate supported by both the board and the second board, and set the port rate to the highest rate.

For a high-speed Ethernet link, a highest rate is generally greater or much greater than a public rate.

The board involved in this embodiment and the first board in the method embodiment belong to the same conception. Reference is made to the method embodiments for a specific implementation process, which is not repeated herein.

In this embodiment, a rate supported by an end is notified to a peer end through an auto-negotiation packet, so that two ends of communication may learn a rate supported by each other, and determine, according to the rate supported by each other, a highest rate supported by both two ends of the communication. An auto-negotiation mechanism may be implemented through a packet without support of specific hardware, and at the same time, through the packet, a rate currently supported by an end may be notified to a peer end, so that the highest rate can be dynamically adjusted, and compatibility and extensibility are good.

A person of ordinary skill in the art may understand that all or a part of the steps of the foregoing embodiments may be implemented by hardware, or may be implemented by a program instructing relevant hardware. The program may be stored in a computer readable storage medium. The foregoing storage medium may be a read-only memory, a magnetic disk, or an optical disk.

The foregoing descriptions are merely exemplary embodiments of the present invention, but are not intended to limit the present invention. Any modification, equivalent replacement, or improvement made within the spirit and principle of the present invention shall all fall within the protection scope of the present invention.

What is claimed is:

1. A method for high-speed link auto-negotiation, comprising:
   setting, by a first board, a first port rate to a public rate supported by both the first board and a second board, wherein a second port rate of the second board is also the public rate;
   sending, by the first board, a first auto-negotiation packet to the second board according to the public rate, wherein the first auto-negotiation packet carries a first rate supported by the first board, so that the second board determines, according to both the first rate supported by the first board that is carried in the first auto-negotiation packet and a second rate supported by the second board, a same highest rate which is supported by both the first board and the second board, and sets the second port rate of the second board to the same highest rate;
   receiving, by the first board, a second auto-negotiation packet at the public rate-that is sent by the second board according to the public rate, wherein the second auto-negotiation packet carries the second rate supported by the second board; and
   determining, by the first board, according to the first rate supported by the first board and the second rate supported by the second board, the same highest rate supported by both the first board and the second board, and setting the first port rate of the first board to the same highest rate;
   wherein identical rates are being used by both the first board and the second board in carrying out respective independent determinations of the same highest rate for both the first board and the second board.

2. The method according to claim 1, wherein after the determining, by the first board, according to the first rate supported by the first board and the second rate supported by the second board, the same highest rate supported by both the first board and the second board, and setting the first port rate of the first board to the same highest rate, the method further comprises:
   setting, by the first board, the first port rate of the first board to the public rate if the first board fails to receive, within a first preset time period, the second auto-negotiation packet sent by the second board.

3. The method according to claim 2, wherein after the setting, by the first board, the first port rate of the first board to the public rate if the first board fails to receive, within a first preset time period, the second auto-negotiation packet sent by the second board, the method further comprises:
   determining, by the first board, whether a first preset protection period is reached; and if the first preset protection period is reached, executing, by the first board, the step of determining, according to the first rate supported by the first board and the second rate supported by the second board, the same highest rate supported by both the first board and the second board, and setting the first port rate of the first board to the same highest rate.

4. The method according to claim 1, wherein the same highest rate is greater than the public rate.

5. The method according to claim 1, wherein after the second board determines, according to the first rate supported by the first board and a second rate supported by the second board, the same highest rate supported by both the first board and the second board, and sets the second port rate of the second board to the same highest rate, the method further comprises:
   setting, by the second board, the second port rate of the second board to the public rate if the second board fails to receive, within a second preset time period, the first auto-negotiation packet sent by the first board.

6. The method according to claim 5, wherein after the setting, by the second board, the second port rate of the second board to the public rate if the second board fails to receive, within a second preset time period, the first auto-negotiation packet sent by the first board, the method further comprises:
   determining, by the second board, whether a second preset protection period is reached; and if the second preset protection period is reached, executing, by the second board, the step of determining, according to the first rate supported by the first board and the second rate supported by the second board, the same highest rate supported by both the first board and the second board, and setting the second port rate of the second board to the same highest rate.

7. A board for high-speed link auto-negotiation, comprising:
  a processor, configured to set a first port rate to a public rate supported by both the board and a second board, wherein a second port rate of the second board is the public rate;
  a transmitter, configured to send a first auto-negotiation packet to the second board according to the public rate, wherein the first auto-negotiation packet carries a first rate supported by the board, so that the second board determines, according to both the first rate supported by the board that is carried in the first auto-negotiation packet and a second rate supported by the second board, a same highest rate supported by both the board and the second board, and sets the second port rate of the second board to the second highest rate; and
  a receiver, configured to receive a second auto-negotiation packet that is sent by the second board according to the public rate, wherein the second auto-negotiation packet carries the second rate supported by the second board;
  wherein the processor is further configured to determine, according to the first rate supported by the board and the second rate supported by the second board, the same highest rate supported by both the board and the second board, and set the first port rate of the first board to the same highest rate;
  wherein identical rates used by both the board and the second board in carrying out respective independent determinations of the same highest rate for both the board and the second board.

8. The board according to claim 7, wherein the processor is further configured to, after determining, according to the first rate supported by the board and the second rate supported by the second board, the same highest rate supported by both the board and the second board, and setting the first port rate of the board to the same highest rate,
  set the first port rate of the board to the public rate if the second auto-negotiation packet sent by the second board fails to be received within a first preset time period.

9. The board according to claim 8, wherein the processor is further configured to, after setting the first port rate of the board to the public rate if the second auto-negotiation packet sent by the second board fails to be received within the first preset time period,
  determine whether a first preset protection period is reached; and if the first preset protection period is reached, determine, according to the first rate supported by the board and the second rate supported by the second board, the same highest rate supported by both the board and the second board, and set the first port rate of the board to the highest rate.

10. The board according to claim 7, wherein the same highest rate is greater than the public rate.

* * * * *